UNITED STATES PATENT OFFICE.

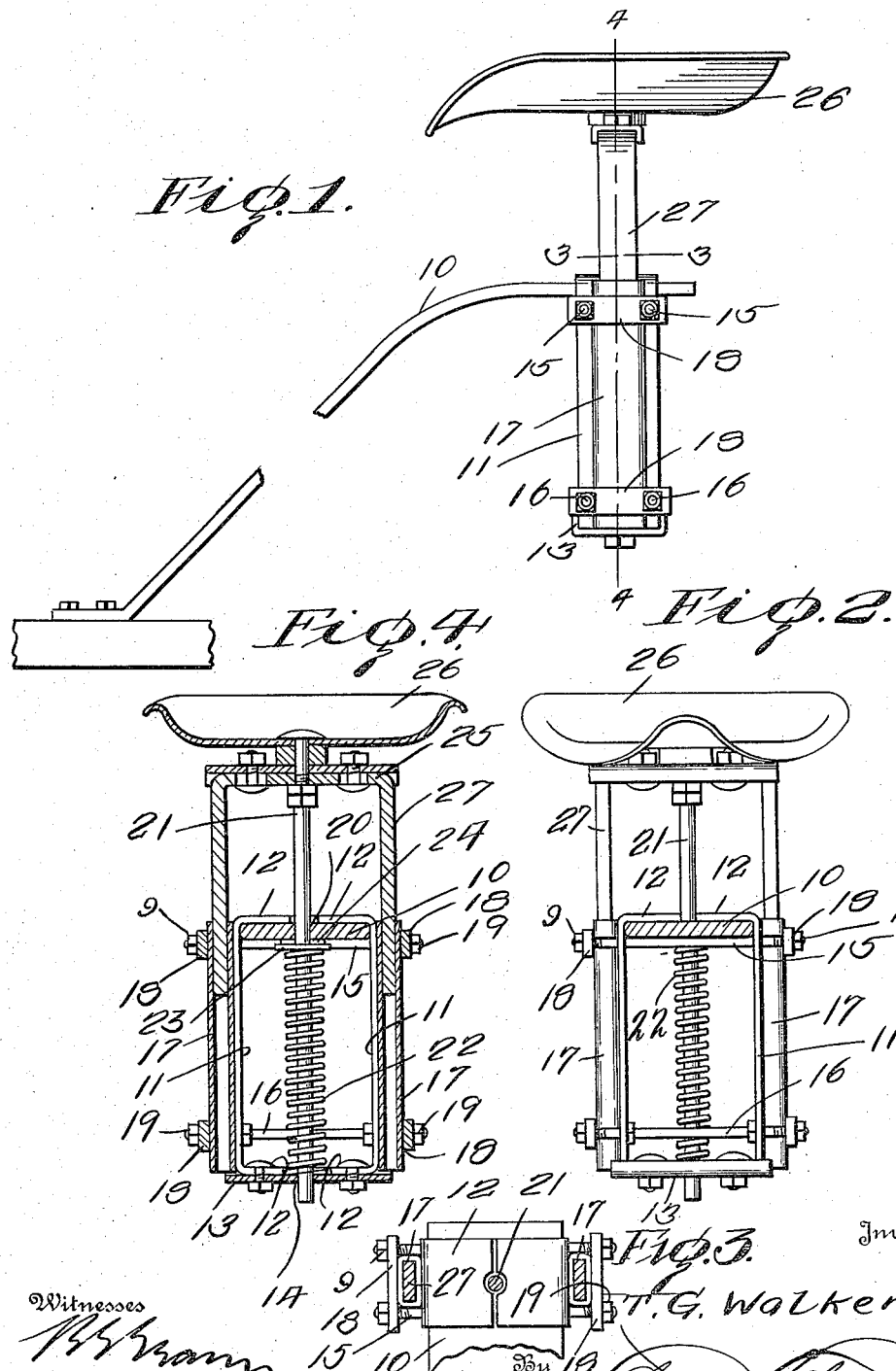

THOMAS G. WALKER, OF NISHNABOTNA, MISSOURI.

SHOCK-ABSORBER FOR RIDING-TOOLS.

1,165,301.  Specification of Letters Patent.  Patented Dec. 21, 1915.

Application filed November 9, 1914. Serial No. 871,111.

*To all whom it may concern:*

Be it known that I, THOMAS G. WALKER, a citizen of the United States, residing at Nishnabotna, in the county of Atchison, State of Missouri, have invented certain new and useful Improvements in Shock-Absorbers for Riding-Tools; and I do hereby declare the following to be a full, clear, and exact description of the invention, such as will enable others skilled in the art to which it appertains to make and use the same.

This invention relates to improvements in seats, and particularly to seats for agricultural machines, such as plows, harrows, planters and the like.

The principal object of the invention is to provide a shock absorber which can be attached to the ordinary seat spring so as to take up the vibration of the seat spring.

Another object is to provide a device of this character which is capable of attachment to the ordinary seat spring without modifications of the spring, and one which will be effective in its operation to produce comfort to the rider.

Other objects and advantages will be apparent from the following description when taken in connection with the accompanying drawings.

In the drawings: Figure 1 is a side elevation of my invention applied to the seat spring of an agricultural machine; Fig. 2 is a front elevation; Fig. 3 is a horizontal sectional view on the line 3—3 of Fig. 1, and Fig. 4 is a vertical section on the line 4—4 of Fig. 1.

Referring particularly to the accompanying drawing, 10 represents the seat spring of the machine, a pair of plates 11 are disposed in vertical parallel relation and have their opposite ends inturned as indicated at 12. The upper inturned ends engage over the upper face of the seat spring, while the lower inturned ends are detachably secured to a plate 13 which is formed with a central opening 14. Passed through the upper end portions of the plates and engaging with the under face of the seat spring are the bolts 15. Similar bolts 16 are passed through the lower portions of the plates. Disposed between the outer ends of the bolts, and lying against the outer faces of the plates 11 are tubular members 17, plates 18 being engaged on the outer ends of the bolts and held against the tubular members by means of the clamping nuts 19. Formed through the seat spring between the adjacent ends of the inturned portions of the plates is an opening 20, this opening being disposed directly over and in alinement with the opening in the before-mentioned lower plate. A post 21 is disposed vertically through these alined openings and has mounted thereon a coil spring 22 which bears against the washer 23 and the said lower plate. This washer is held in proper position on the post by means of a cross key 24. A yoke 25 is disposed above the seat spring and carries on its cross portion the seat 26. The depending arms 27 of the yoke are slidably mounted in the said tubular members, the upper end of the post bearing against the cross member of the yoke and normally forcing the yoke into its uppermost position. This movement of the seat independently of the movement of the seat spring readily takes up any danger or shock incident to the vibration of the seat spring, the seat remaining substantially stationary when the spring rises on the rebound, thus the rider is prevented from being bounced up and down by the vibration of the seat spring.

What is claimed is:

A shock absorbing attachment for a seat spring comprising a frame detachably secured to the spring, vertically disposed tubular members mounted on the frame at each side of the spring, a yoke having its arms slidably disposed in the tubular members and carrying a seat on the upper end thereof, and a resiliently carried post vertically slidable through the frame and spring and engaging with a portion of the yoke to force the yoke normally upward.

In testimony whereof, I affix my signature, in the presence of two witnesses.

THOMAS G. WALKER.

Witnesses:
 F. LANGEHEMY.
 HARMON WALKER.

Copies of this patent may be obtained for five cents each, by addressing the "Commissioner of Patents, Washington, D. C."